Aug. 5, 1958 J. G. SPRACKLEN 2,846,582

SCANNING GENERATOR

Filed Oct. 30, 1956 2 Sheets-Sheet 1

Inventor
John G. Spracklen
by John J. Pederson
Attorney

Aug. 5, 1958 J. G. SPRACKLEN 2,846,582

SCANNING GENERATOR

Filed Oct. 30, 1956 2 Sheets-Sheet 2

Inventor
John G. Spracklen
by John J. Pederson
Attorney

United States Patent Office 2,846,582

Patented Aug. 5, 1958

2,846,582

SCANNING GENERATOR

John G. Spracklen, Chicago, Ill., assignor to Zenith Radio Corporation, a corporation of Delaware Application October 30, 1956, Serial No. 619,195

6 Claims. (Cl. 250—36)

Figure 1:
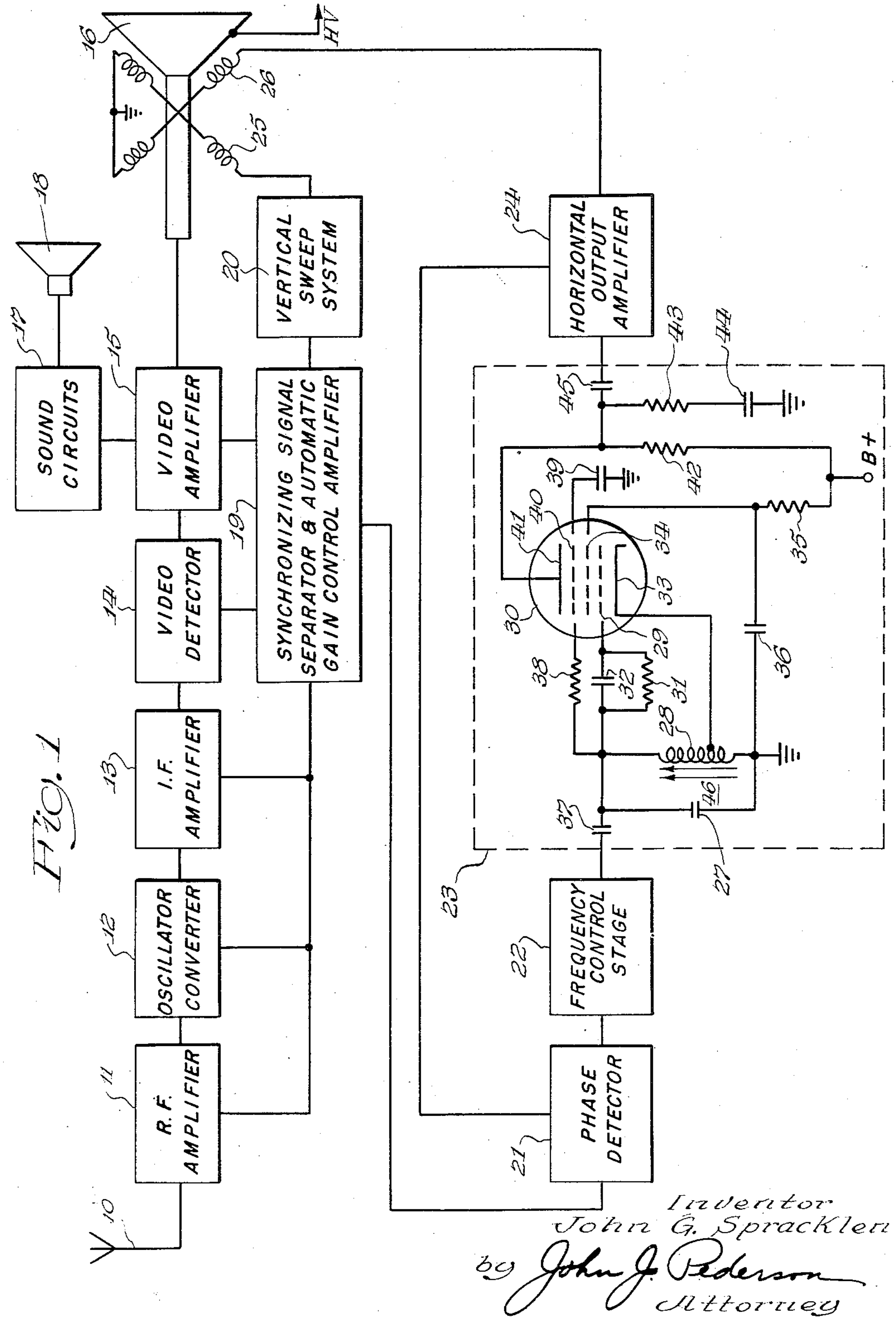

This invention relates to a scanning generator. More particularly it relates to a frequency-controllable single-stage scanning generator for developing the generally sawtooth-wave sweep signals for use in television receivers or the like.

In present day television receivers, a video-modulated electron beam is caused to scan the luminescent screen of a cathode-ray tube in exact spatial synchronism with the beam that scans the image target of the studio-camera tube. To accomplish this end certain synchronizing pulses are generated in the transmission equipment and are added, at appropriate predetermined intervals, to the video signal to form a composite signal for application to the carrier and subsequent transmission to remote receivers. At the receiver the synchronizing signals are separated from the composite video signal and used to supply the vertical and horizontal scanning circuits with the information necessary to bring about the aforementioned beam spatial synchronism required for the production of a coherent picture.

Normally the receiver horizontal-scanning system comprises a phase-detector stage, a frequency-control stage, an oscillator stage, an energy-storage device, a discharge tube, and a horizontal-output amplifier. The phase-detector stage serves to generate a unidirectional signal having an amplitude and/or polarity which is a function of the phase relationship existing between the horizontal-synchronizing signal and the scanning signal appearing at the output of the horizontal amplifier. This unidirection signal serves to vary the magnitude of the reactive current passing through the frequency-control stage. The frequency-control stage and the oscillator are intimately coupled in such a manner that the reactive current of the former forms a component of the current appearing in the oscillator frequency-determining circuit and hence becomes a factor in determining the frequency of the signal generated by the oscillator.

The generally sawtooth horizontal-scansion signal is generated across an energy-storage device normally of the capacitive variety. The discharge tube serves as a gate or switch having two impedance states which differ substantially in magnitude. During the major or charging portion of the scanning cycle, the discharge tube presents a near-infinite impedance shunt path to the energy-storage capacitor and hence charge accumulates at a rate established by the time constant of the charging circuit and the magnitude of the charging voltage. During the discharge or retrace portion of the scanning cycle, the impedance of the tube is lowered appreciably by the application of an appropriately polarized, signal pulse to the control electrode resulting in a rapid loss of charge by the energy-storage capacitor. The signal generated by the previously discussed oscillator, after passage through an appropriate wave-shaping network, is coupled to the discharge-tube control electrode and, hence, serves to bring about this switch action at intervals determined by its operating frequency. Since the frequency and phase relationships of the oscillator are under the control of the phase detector and intercoupled frequency-control tube, the essential exact phase synchronism between the transmitted horizontal-synchronizing signal and the horizontal-scanning signal generated within the receiver may be attained. The resulting signal has a gradual relatively linear positive slope during the charge interval and a steep negative slope during the discharge interval. The composite signal of generally sawtooth wave form so generated is then coupled to the horizontal output amplifier for subsequent application to the horizontal deflection system associated with the cathode-ray tube image reproduced.

In the widely used horizontal-scanning system described, the oscilaltor stage and discharge tube comprise separate and independent stages requiring the use of two separate electron-discharge devices or a single electron-discharge device of the dual type. This is objectionable from the point of view of economy and convenience since it increases the number of electron-discharge devices required to make the television receiver operational or eliminates the possibility of using a half-section of a dual electron-discharge device elsewhere in the receiver circuitry. Previous attempts to combine both the oscillator and discharge functions within a single stage using a single commercially available electron-discharge device have been notably unsuccessful. This has been due primarily to an inability to obtain the steep negative slope during the discharge interval essential to effective beam retrace and satisfactory operation of the universally used "kick" or "flyback" high-voltage power supply.

It is accordingly an object of the present invention to provide a scanning generator which overcomes the aforementioned difficulties of prior systems of this type.

It is a further object of the present invention to provide a new and more economical scanning generator for use in television receivers or the like.

More particularly it is an object of the present invention to provide a television scanning generator which incorporates the functions of the horizontal-scanning oscillator and the discharge tube within a single stage capable of generating a generally sawtooth waveform having the necessary steep negative slope during the discharge interval to insure effective beam retrace and satisfactory operation of the high-voltage power supply.

A frequency-controllable single-stage scanning generator for developing a sweep signal of generally sawtooth waveform, constructed in accordance with the invention, includes an electron-control device having an emitter electrode, an output electrode, a pair of control electrodes, and an accelerator electrode positioned intermediate the control electrodes. An oscillator including a resonant frequency-determining circuit coupled to the emitter electrode, the accelerating electrode, and one of the control electrodes is provided for the generation of a signal of a predetermined frequency. Means are provided for applying a signal of like predetermined frequency to the other control electrode in substantial phase quadrature with the signal appearing at the first control electrode to establish current pulses between the emitter electrode and the output electrode during predetermined intervals which recur at the predetermined oscillator frequency. An energy-storage device and an associated charging circuit are provided, and the energy-storage device is so coupled to the output electrode of the electron-control device as to permit utilization of the recurring current pulses to discharge the energy-storage device during the predetermined intervals.

Figure 2:
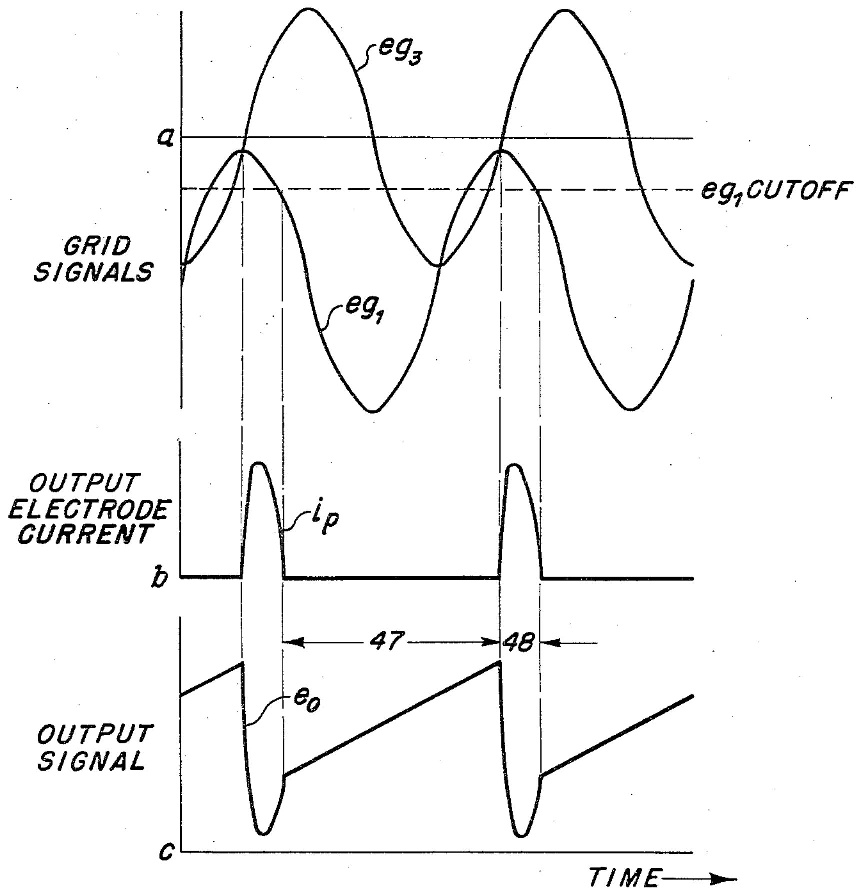

The features of the present invention which are believed to be novel are set forth with particularity in the appended claims. The organization and manner of operation of the invention, together with further objects and advantages thereof, may best be understood by reference to the following description taken in connection with the accompanying drawings, in which:

Figure 1 is a schematic diagram of a television receiver incorporating a scanning generator constructed in accordance with the present invention; and Figure 2 is a graphical representation of illustrative signal waveforms occurring at various points in the circuit of Figure 1.

The television receiver illustrated in Figure 1 is, with the exception of the scanning generator 23, conventional in design and hence has been presented, for the most part, in block diagram form. The composite television signal is received by an appropriate antenna 10 which is coupled to the input circuit of the radio-frequency (R. F.) amplifier 11. The amplified output is applied to the oscillator-converter 12 where, through the process of heterodyning, the composite television signal is converted to an intermediate frequency for subsequent application to the I. F. amplifier chain 13. The amplified intermediate-frequency signal is applied to a video detector 14. A video amplifier 15 of one or more stages follows the video detector 14 and serves to amplify the video information detected in the previous stage before application to the appropriate electrodes of a cathode-ray image reproducer 16. Video detector 14 is also coupled to a conventional sound circuit 17 where the sound information is detected, amplified, and applied to a sound-reproducer 18.

In addition to the video and sound information, the received composite television signal contains vertical and horizontal synchronizing information which must be supplied to the vertical-sweep and horizontal-scanning circuits to insure exact spatial synchronism between the image-reproducer beam and the scanning electron beam of the studio-camera tube. The synchronizing-signal separator and automatic-gain-control amplifier 19 serves to separate these signals from the video information and to supply them respectively to the vertical-sweep system 20 and to the horizontal-scanning system comprising a phase detector 21, a frequency-control stage 22, a scanning generator 23, and a horizontal-output amplifier 24. The vertical-sweep system 20 may be any of the well known types for generating a synchronized sweep signal for application to an appropriate vertical magnetic-deflection coil 25 associated with image reproducer 16.

Phase detector 21, frequency-control stage 22, and horizontal-output amplifier 24, shown in the horizontal-scanning system may be of well known conventional design. Horizontal-output amplifier 24 is coupled to an appropriate magnetic-deflection coil 26, and a comparison signal from amplifier 24 is applied to phase detector 21 for phase comparison with the horizontal-synchronizing signal derived from the synchronizing-signal separator and AGC amplifier 19. Phase detector 21 develops a unidirectional error signal which is utilized to vary the magnitude of the reactive current passing through the frequency-control stage 22 and hence to vary the frequency of the scanning generator 23. By virtue of the loop so formed, the frequency and phase of the scanning generator 23 is automatically and continuously adjusted to maintain the exact synchronism between the camera-tube and image-reproducer beams necessary for the production of a coherent picture.

Frequency-controllable single-stage scanning generator 23 comprises an oscillator section of the "Hartley" type having a frequency-determining circuit 46 composed of a capacitor 27 and an adjustable inductor 28 connected in shunt. One terminal of the frequency-determining circuit 46 is coupled to a control electrode 29 of an electron-control device, here shown as a pentode type electron-discharge device 30, through the parallel combination of a bias generating resistor 31 and a coupling capacitor 32, the other terminal being returned to ground. The parallel combination of resistor 31 and capacitor 32 serves to provide self-biased operation of the oscillator section. The emitter electrode or cathode 33 of device 30 is coupled to an appropriate tap on variable inductor 28 to provide the current feedback path essential for self-sustaining oscillation of the device. The accelerator electrode or screen grid 34 of device 30 is coupled, through a voltage-dropping resistor 35, to the positive terminal of a unidirectional operating-voltage source, conventionally designated B+, thereby completing the current path for the oscillator section of the device. A bypass capacitor 36 is coupled between screen grid 34 and ground to provide a low-impedance signal path to the low-potential or grounded terminal of frequency-determining circuit 46. Frequency-control stage 22 is coupled to the high-potential terminal of frequency-determining circuit 46 by means of a capacitor 37.

As so far described, the circuit is typically that which is found in an oscillator of the basic Hartley type. At this point, however, the circuit deviates from the conventional in that the high-potential terminal of frequency-determining circuit 46 is coupled, by means of a phase-shifting network comprising a series resistor 38 and a shunt capacitor 39, to the second control electrode 40 of device 30. The output electrode 41 is coupled to B+ through a load resistor 42. A wave-shaping resistor 43 and an energy-storage capacitor 44 are series-connected between the output-electrode 41 and ground. The signal appearing at the junction of output electrode 41, load resistor 42, and wave-shaping resistor 43 is applied through a capacitor 45 to the input circuit of the horizontal-output amplifier 24.

In operation, the basic frequency of the generally sinusoidal signal generated by the oscillator section of scanning generator 23 is adjusted to substantially coincide with the fundamental-frequency component of the horizontal-synchronizing signal by varying the axial position of the adjustable core of inductor 28 relative to the winding. The self-bias arrangement comprising resistor 31 and capacitor 32 so adjusts the bias voltage appearing at first control electrode 29 that space current flows from the cathode 33 to screen grid 34 only during short conduction intervals which coincide with the maximum-positive voltage regions of the generally sinusoidal signal appearing across frequency-determining or tank circuit 46. By virtue of the phase-shift circuit composed of resistor 38 and capacitor 39, a signal $e_{g3}$ is applied to second control electrode 40 in substantial lagging quadrature phase with the signal $e_{g1}$ appearing at first control electrode 29, as shown in part "*a*" of the curves in Figure 2. This signal acts in the capacity of a gating signal to abruptly switch a portion of the space current from screen grid 34 to anode 41 during the latter portions of the aforementioned conduction intervals. The resulting output-electrode current pulses $i_p$ have a steep leading edge as shown in curve *b* of Figure 2. This results from the gating action having occurred at approximately the positive-going zero cross-over of the generally sinusoidal-gating signal $e_{g3}$ appearing at second control electrode 40, i. e., the region of maximum-positive slope.

During the portion of the oscillator period in which no current is received by the output electrode 41, the output impedance of electron-control device 30 is substantially infinite and energy-control storage capacitor 44 is free to accumulate charge from the unidirectional-potential source B+ by way of the charging circuit comprising load resistor 42 and wave-shaping resistor 43. During this charging interval, represented by 47 of curve C in Figure 2, the substantially linear portion of the composite sawtooth output signal $e_o$ appears at the junction of load resistor 42 and wave-shaping resistor 43. Upon initiation of the current pulse to output electrode 41, the effective output impedance of electron-control device 30 is materially reduced causing energy-storage capacitor 44 to discharge at a high rate through wave-shaping resistor 43 and the reduced cathode-to-anode internal impedance of device 30. This discharge interval 48 is coincident with the output-electrode conduction interval, as shown in curve C in Figure 2. The leading edge of the portion of the output waveform occurring during this discharge interval exhibits a steep negative slope as a result of the abrupt change in the anode impedance of device 30 induced by the rapid gating action of the signal appearing at second control electrode 40 as previously described. The resulting composite output signal $e_0$ appearing at the junction of load resistor 42 and wave-shaping resistor 43 is a combination of that generated during the charge and discharge intervals and has the generally sawtooth waveform shown in curve C of Figure 2.

Output signal $e_0$ is applied through capacitor 45 to horizontal-output amplifier 24 for amplification and subsequent application to horizontal magnetic-deflection system 26 associated with image reproducer 16. A comparison signal from the horizontal amplifier is applied to the phase detector 31 for phase comparison with the horizontal-synchronizing signal derived from the received composite television signal as previously described. The resulting error signal serves to vary the impedance of the frequency-control stage 22 and hence the magnitude of the reactive component of the shunting impedance coupled to the high-potential terminal of the frequency-determining circuit, the shunting impedance comprising the series combination of capacitor 37 and the output impedance of the frequency-control tube 22. After the initial adjustment of the oscillation frequency by means of the variable inductor 28, the frequency and phase of the scanning-generator output remain locked to the horizontal-synchronizing signal through the medium of the described automatic-frequency-control loop.

Thus the present invention provides a scanning generator with all the advantages of typical generators used in present day television receivers but without the necessity of having separate oscillator and discharge tube stages. This is important from an economy standpoint in that it reduces the number of electron tubes required or, should a dual electron tube be used, makes available one of the sections for application elsewhere in the receiver. The scanning signal output suffers no degradation nor does the use of the present invention necessitate changes in the automatic frequency control techniques presently in use.

Certain aspects of the disclosed circuit are described and claimed in the copending application of John G. Spracklen, Serial No. 320,865, filed November 17, 1952, now Patent No. 2,811,581, issued October 29, 1957, and assigned to the same assignee.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a television receiver, a frequency-controllable single-stage scanning generator for developing a sweep signal of generally sawtooth waveform comprising: an electron-control device including an emitter electrode, an output electrode, a pair of control electrodes, and an accelerating electrode intermediate said control electrodes; an oscillator comprising a resonant frequency-determining circuit coupled to said emitter electrode, said accelerating electrode, and one of said control electrodes for generating a signal of a predetermined frequency; means for applying a signal of said predetermined frequency to the other of said control electrodes in substantial phase quadrature with the signal appearing at said one control electrode to establish current pulses between said emitter electrode and said output electrode during predetermined intervals recurring at said predetermined frequency; an energy-storage device; a charging circuit for said energy-storage device; and means coupling said energy-storage device to said output electrode for utilizing said current pulses to discharge said energy-storage device during said predetermined intervals.

2. In a television receiver, a frequency-controllable single-stage scanning generator for developing a sweep signal of generally sawtooth waveform comprising: an electron-control device including an emitter electrode, an output electrode, a pair of control electrodes, and an accelerating electrode intermediate said control electrodes; an oscillator comprising a resonant frequency-determining network coupled to said emitter electrode, said accelerating electrode, and one of said control electrodes for generating a signal of predetermined frequency; means including a phase-shifting network coupled between said frequency-determining circuit and the other of said control electrodes for applying said signal to said other control electrode in substantial phase quadrature with the signal appearing at said one control electrode to establish current pulses between said emitter electrode and said output electrode during predetermined intervals recurring at said predetermined frequency; an energy-storage device; a charging circuit for said energy-storage device; and means coupling said energy-storage device to said output electrode for utilizing said current pulses to discharge said energy-storage device during said predetermined intervals.

3. In a television receiver, a frequency-controllable single-stage scanning generator for developing a sweep signal of generally sawtooth waveform comprising: an electron-control device including an emitter electrode, an output electrode, a pair of control electrodes, and an accelerating electrode intermediate said control electrodes; an oscillator comprising a resonant frequency-determining network coupled to said emitter electrode, said accelerating electrode, and one of said control electrodes for generating a signal of predetermined frequency; means for biasing said one control electrode to provide class "C" operation of said oscillator; means for applying a signal of said predetermined frequency to the other of said control electrodes in substantial phase quadrature with the signal appearing at said one control electrode to establish current pulses between said emitter electrode and said output electrode during predetermined intervals recurring at said predetermined frequency; an energy storage device; a charging circuit for said energy-storage device; and means coupling said energy-storage device to said output electrode for utilizing said current pulses to discharge said energy-storage device during said predetermined intervals.

4. In a television receiver, a frequency-controllable single-stage scanning generator for developing a sweep signal of generally sawtooth waveform comprising: an electron-control device including an emitter electrode, an output electrode, a pair of control electrodes, and an accelerating electrode intermediate said control electrodes; an oscillator comprising a resonant frequency-determining network coupled to said emitter electrode, said accelerating electrode, and one of said control electrodes for generating a substantially sinusoidal signal of predetermined frequency; means for applying a signal of said predetermined frequency to the other of said control electrodes in substantial phase quadrature with the signal appearing at said one control electrode to establish current pulses of steep wave front between said emitter electrode and said output electrode during intervals commencing with the maximum positive slope regions of said quadrature-phase signal appearing at said other control electrode and recurring at said predetermined frequency; an energy-storage device; a charging circuit for said energy storage device; and means coupling said energy-storage device to said output electrode for utilizing said current pulses to discharge said energy-storage device during said predetermined intervals.

5. In a television receiver a frequency-controllable single-stage scanning generator for developing a sweep signal of generally sawtooth waveform comprising: an electron-control device including an emitter electrode, an output electrode, a pair of control electrodes, and an accelerating electrode intermediate said control electrodes; an oscillator comprising a resonant frequency-determining circuit coupled to said emitter electrode, said accelerating electrode, and one of said control electrodes for generating a signal of a predetermined frequency; means for applying a signal of said predetermined frequency to the other of said control electrodes in substantial phase quadrature with the signal appearing at said one control electrode to establish current pulses between said emitter electrode and said output electrode during predetermined intervals recurring at said predetermined frequency; a load impedance coupled to said output and emitter electrodes; an energy-storage capacitor; means including said load impedance for charging said capacitor; and means coupling said capacitor to said output electrode for utilizing said current pulses to discharge said capacitor during said predetermined intervals.

6. In a television receiver, a frequency-controllable single-stage scanning generator for developing a sweep signal of generally sawtooth waveform comprising: an electron-discharge device including a cathode, an output electrode, a pair of control electrodes, and an accelerating electrode intermediate said control electrodes; an oscillator comprising a resonant frequency-determining network coupled to said cathode, said accelerating electrode, and one of said control electrodes for generating a substantially sinusoidal signal of predetermined frequency; means for biasing said one control electrode to provide class "C" operation of said oscillator; means including a phase-shift network coupled between said frequency-determining network and the other of said control electrodes for applying said signal to said other electrode in substantial phase quadrature with the signal appearing at said one control electrode to establish current pulses of steep wave front between said cathode and said output electrode during intervals commencing with the maximum positive slope region of said quadrature-phase signal appearing at said other control electrode and recurring at said predetermined frequency; a load impedance coupled to said output electrode and said cathode; an energy-storage capacitor; means including said load impedance for charging said capacitor; and means coupling said capacitor to said output electrode for utilizing said current pulses to discharge said capacitor during said predetermined intervals.

References Cited in the file of this patent

UNITED STATES PATENTS 2,203,519 Cawein ---------------- June 4, 1940